(12) United States Patent
Haghani et al.

(10) Patent No.: US 10,499,065 B2
(45) Date of Patent: Dec. 3, 2019

(54) SYSTEM AND METHOD FOR SENDING VIDEO DATA OVER A WIRELESS CHANNEL

(71) Applicant: Samsung Display Co., Ltd., Yongin, Gyeonggi-do (KR)

(72) Inventors: Ehsan Haghani, Redwood City, CA (US); Amin Mobasher, San Jose, CA (US); Jalil Kamali, San Jose, CA (US)

(73) Assignee: Samsung Display Co. Ltd., Yongin-si (KR)

( * ) Notice: Subject to any disclaimer, the term of this patent is extended or adjusted under 35 U.S.C. 154(b) by 226 days.

(21) Appl. No.: 15/288,977

(22) Filed: Oct. 7, 2016

(65) Prior Publication Data

US 2018/0027243 A1  Jan. 25, 2018

Related U.S. Application Data

(60) Provisional application No. 62/365,331, filed on Jul. 21, 2016.

(51) Int. Cl.
*H04N 7/12* (2006.01)
*H04N 11/02* (2006.01)
*H04N 11/04* (2006.01)
*H04N 19/172* (2014.01)
*H04N 19/37* (2014.01)
*H04N 19/162* (2014.01)
*H04N 19/88* (2014.01)

(52) U.S. Cl.
CPC ......... *H04N 19/172* (2014.11); *H04N 19/162* (2014.11); *H04N 19/37* (2014.11); *H04N 19/88* (2014.11)

(58) Field of Classification Search
None
See application file for complete search history.

(56) References Cited

U.S. PATENT DOCUMENTS 7,206,456 B2  4/2007  Hannuksela et al.
7,227,900 B2  6/2007  Porter et al.
(Continued)

FOREIGN PATENT DOCUMENTS

CN  104602001 A  5/2015

OTHER PUBLICATIONS

Ravindra, G. et al., "On Tile Assignment for Region-of-Interest Video Streaming in a Wireless LAN", Department of Computer Science, National University of Singapore, http://www.comp.nus.edu.sg/~ooiwt/papers/nossdav12-roi.pdf (6 pages).

*Primary Examiner* — Chikaodili E Anyikire
(74) *Attorney, Agent, or Firm* — Lewis Roca Rothgerber Christie LLP (57) ABSTRACT

A system and method for transmitting video. Each frame of video is divided into a number of regions, that are transmitted in order beginning with a region of most importance. The region of most importance may be different from one frame to the next. When the video is transmitted over a channel with limited channel capacity, so that some frames are not transmitted completely, the region of most importance in a current frame may be selected to be the first region not transmitted in the previous frame. The system and method may be useful for the transmission of video data over a wireless link having variable or limited channel capacity.

18 Claims, 7 Drawing Sheets

(56) References Cited

U.S. PATENT DOCUMENTS

| | | |
|---|---|---|
| 7,397,851 B2 | 7/2008 | Roman |
| 7,425,981 B2 | 9/2008 | Kamariotis |
| 7,813,430 B2 | 10/2010 | Kobayashi et al. |
| 7,826,531 B2 | 11/2010 | Wang et al. |
| 7,916,794 B2 * | 3/2011 | Li .................. H04N 19/156 |
| | | 375/240.01 |
| 8,345,749 B2 | 1/2013 | Quast et al. |
| 8,358,700 B2 | 1/2013 | Kong et al. |
| 8,514,933 B2 | 8/2013 | Liang et al. |
| 8,615,039 B2 | 12/2013 | Lee et al. |
| 8,798,148 B2 | 8/2014 | Kostrzewski et al. |
| 9,185,429 B1 | 11/2015 | Gu et al. |
| 2010/0037270 A1 | 2/2010 | Bennett |
| 2010/0128797 A1 | 5/2010 | Dey |
| 2011/0001884 A1 * | 1/2011 | Iketani .................. H04N 5/145 |
| | | 348/699 |
| 2013/0101035 A1 | 4/2013 | Wang et al. |
| 2014/0307775 A1 | 10/2014 | Ouedraogo et al. |
| 2014/0355671 A1 | 12/2014 | Peng et al. |
| 2015/0036747 A1 | 2/2015 | Oh et al. |
| 2015/0110118 A1 | 4/2015 | Ouedraogo et al. |
| 2015/0237351 A1 | 8/2015 | Lee et al. |
| 2015/0371613 A1 * | 12/2015 | Patel .................. G06F 21/10 |
| | | 345/549 |

\* cited by examiner

$$RoMI = \underset{R_i}{Arg}\max \sum_{(m,n)\in R_i} [P(m,n) - Q(m,n)]^2$$

| Frame m | | | |
|---|---|---|---|
| 7 | 14 | 2 | 8 |
| 13 | 1 | 11 | 16 |
| 3 | 6 | 9 | 4 |
| 10 | 5 | 15 | 12 |

Sent: columns 1-3; Not sent: column 4

| Frame m+1 | | | |
|---|---|---|---|
| 10 | 5 | 15 | 12 |
| 13 | 7 | 2 | 4 |
| 6 | 1 | 11 | 9 |
| 16 | 8 | 14 | 3 |

SYSTEM AND METHOD FOR SENDING VIDEO DATA OVER A WIRELESS CHANNEL

CROSS-REFERENCE TO RELATED APPLICATION(S)

The present application claims priority to and the benefit of U.S. Provisional Application No. 62/365,331, filed Jul. 21, 2016, entitled "A SYSTEM AND METHOD FOR SENDING VIDEO DATA OVER A WIRELESS CHANNEL", the entire content of which is incorporated herein by reference.

FIELD

One or more aspects of embodiments according to the present invention relate to the transmission of video data, and more particularly to the transmission of video data over a wireless link.

BACKGROUND

Video transmission over wireless may be useful in various situations, such as when a video source or a display is mobile, or when a user prefers to avoid the use of cables. Video traffic may be delay sensitive, however, and providing acceptable quality may depend on sustained throughput. Related art codecs using e.g., Moving Picture Experts Group (MPEG) encoding may compress the video content and thus reduce the required throughput for video transmission. Compression, however, may rely on buffering, encoding, and decoding which impose memory and computation constraints that may not be consistently met when transmitting high definition video. Further, such codecs may utilize data retransmission schemes to respond to high bit errors or losses, potentially resulting in delay that may be unacceptable in some delay sensitive applications, such as interactive video or gaming. Some codecs may also allow for error propagation, which may degrade video quality, especially on larger displays.

Thus, there is a need for an improved system and method for wireless video transmission.

SUMMARY

Aspects of embodiments of the present disclosure are directed toward a system and method for transmitting video. Each frame of video is divided into a number of regions that are transmitted in order beginning with a region of most importance. The region of most importance may be different from one frame to the next. When the video is transmitted over a channel with limited channel capacity, so that some frames are not transmitted completely, the region of most importance in a current frame may be selected to be the first region (i.e., first in time) not transmitted in the previous frame. The system and method may be useful for the transmission of video data over a wireless link having variable or limited channel capacity.

According to an embodiment of the present invention there is provided a method for transmitting video for a display panel including N regions, numbered 1 through N, wherein N is a positive integer, the method including: identifying, for a first frame of video, a first region of most importance, from among the N regions; transmitting data from the first frame of video, one region at a time, beginning with the first region of most importance, until a first frame transmission interval corresponding to the first frame of video has elapsed; identifying, for a second frame of video, a second region of most importance, from among the N regions, the second region of most importance being different from the first region of most importance; and transmitting data from the second frame of video, one region at a time, beginning with the second region of most importance, until a second frame transmission interval corresponding to the second frame of video has elapsed.

In one embodiment, the identifying of the second region of most importance includes identifying a region from among the N regions for which a measure of the difference between data for the first frame and data for the second frame is greatest, when during the first frame transmission interval all N regions were transmitted.

In one embodiment, the identifying of the second region of most importance includes selecting the region having the next region number following, in cyclic order, the region number of the last region transmitted during the first frame transmission interval, when during the first frame transmission interval not all N regions were transmitted.

In one embodiment, the identifying of the second region of most importance includes identifying a region from among the N regions for which a measure of the difference between data for the first frame and data for the second frame is greatest, when during the first frame transmission interval all N regions were transmitted.

In one embodiment, the first frame of video includes sub-pixel data, the second frame of video includes sub-pixel data, and the measure of the difference is the sum, over the sub-pixel data in the region, of: the square of: the difference between: the value of the sub-pixel data of the first frame of video, and the value of the sub-pixel data of the second frame of video.

In one embodiment, the identifying of the second region of most importance includes receiving from a user an indication of which region is the region of most importance.

In one embodiment, the transmitting of data from the first frame of video further includes transmitting an identifier for the first region of most importance.

In one embodiment, the transmitting of data from the first frame of video, one region at a time, includes encoding the data from the first frame of video, one region at a time; and the transmitting of data from the second frame of video, one region at a time, includes encoding the data from the second frame of video, one region at a time.

In one embodiment, the method includes: receiving data from the first frame of video, one region at a time; decoding the data from the first frame of video, one region at a time; receiving data from the second frame of video, one region at a time; and decoding the data from the second frame of video, one region at a time.

In one embodiment, the method includes: supplementing the decoded data from the second frame of video with corresponding data from the first frame of video, when during the second frame transmission interval not all N regions were transmitted.

In one embodiment, the transmitting of data from the first frame of video, one region at a time, beginning with the first region of most importance, includes transmitting data by region number in cyclic order.

In one embodiment, the transmitting of data from the first frame of video, one region at a time, beginning with the first region of most importance, includes transmitting data by region number in order of decreasing importance.

According to an embodiment of the present invention there is provided a transmitter for transmitting video for a display panel including N regions, numbered 1 through N, wherein N is a positive integer, the transmitter being configured to: identify, for a first frame of video, a first region of most importance, from among the N regions; transmit data from the first frame of video, one region at a time, beginning with the first region of most importance, by region number in cyclic order, until a first frame transmission interval corresponding to the first frame of video has elapsed; identify, for a second frame of video, a second region of most importance, from among the N regions, the second region of most importance being different from the first region of most importance; and transmit data from the second frame of video, one region at a time, beginning with the second region of most importance, by region number in cyclic order, until a second frame transmission interval corresponding to the second frame of video has elapsed.

In one embodiment, the identifying of the second region of most importance includes selecting the region having the next region number following, in cyclic order, the region number of the last region transmitted during the first frame transmission interval, when during the first frame transmission interval not all N regions were transmitted.

In one embodiment, the identifying of the second region of most importance includes identifying a region from among the N regions for which a measure of the difference between data for the first frame and data for the second frame is greatest, when during the first frame transmission interval all N regions were transmitted.

In one embodiment, the first frame of video includes sub-pixel data, the second frame of video includes sub-pixel data, and the measure of the difference is the sum, over the sub-pixel data in the region, of: the square of: the difference between: the value of the sub-pixel data of the first frame of video, and the value of the sub-pixel data of the second frame of video.

In one embodiment, the identifying of the second region of most importance includes receiving from a user an indication of which region is the region of most importance.

In one embodiment, the transmitting of data from the first frame of video further includes transmitting an identifier for the first region of most importance.

According to an embodiment of the present invention there is provided a method for transmitting video over a wireless link, the method including: storing a first frame of video data in a buffer; dividing the first frame into N regions, N being a positive integer; sending, over the wireless link, video data from a first subset of the N regions, and not sending the video data from a second subset of the N regions, the first subset and the second subset being disjoint and together including all of the N regions, storing a second frame of video data in a buffer; dividing the second frame into the N regions; and sending, over the wireless link, video data from a third subset of the N regions and not sending the video data from a fourth subset of the N regions, the regions of the second subset being in the third subset.

In one embodiment, the regions in the fourth subset are in the first subset.

In one embodiment, the method includes: before the sending of the video data from a first subset of the N regions, encoding the video data from the first subset one region at a time; and before the sending of the video data from a third subset of the N regions, encoding the video data from the third subset one region at a time.

In one embodiment, the method includes: receiving the video data from a first subset of the N regions; displaying a first image including the video data from a first subset of the N regions; receiving the video data from a third subset of the N regions; and displaying a second image including: the video data from a third subset of the N regions; and video data from regions, of the first subset of the N regions, corresponding to the fourth subset of the N regions.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a system and method for sending video data over a wireless channel provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
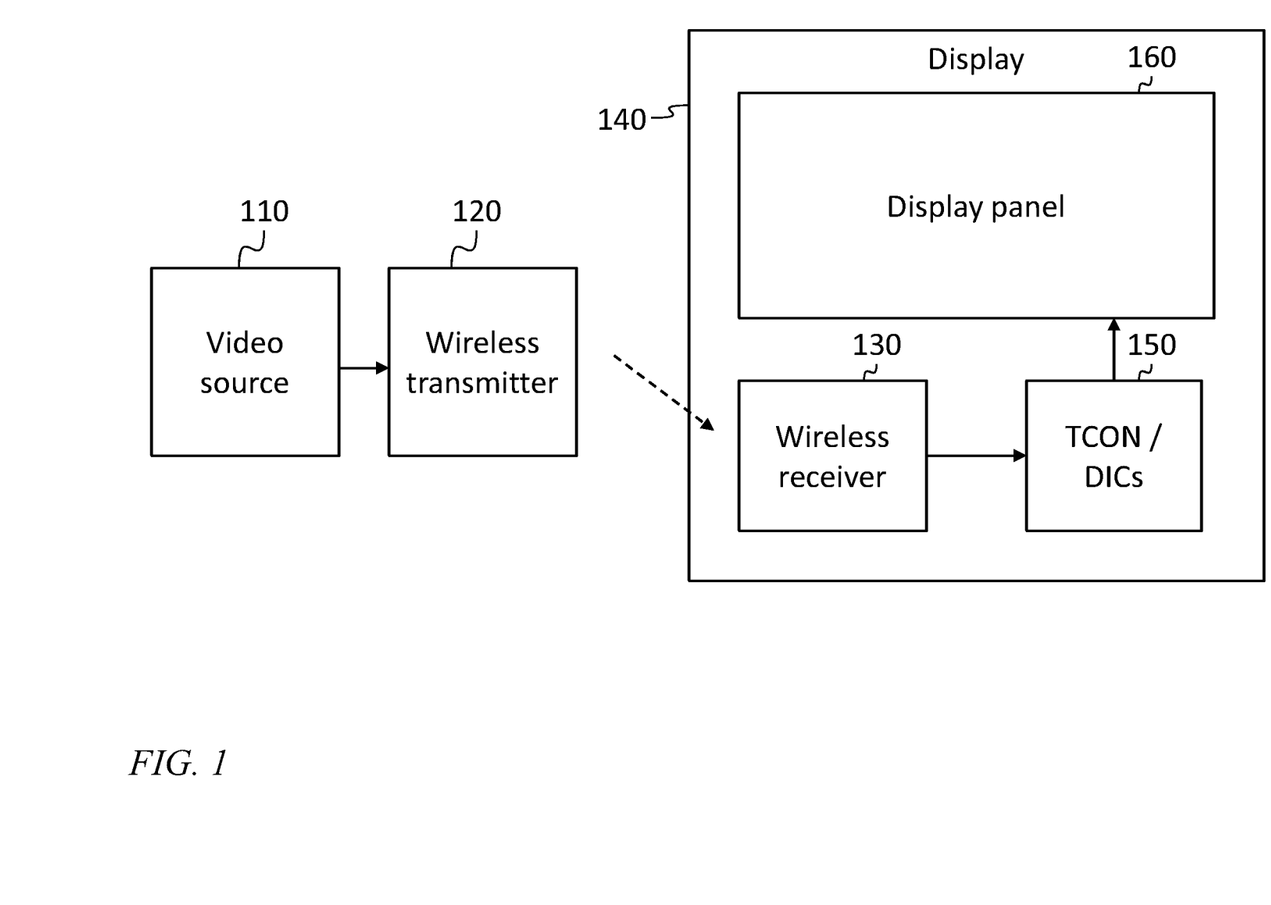
FIG. 1 is a block diagram of a video system including a wireless link, according to an embodiment of the present invention.

Referring to FIG. 1, in some embodiments a video source 110, such as a video card of a computer, generates video data, one frame at a time, and provides it to a wireless transmitter 120. The wireless transmitter 120 transmits the video to a wireless receiver 130 in, or connected to, a display 140. The display includes further circuitry 150 (that may include a timing controller (TCON) and a plurality of driver integrated circuits (DICs)) and a display panel 160. The display panel includes a plurality of pixels, each of which may include a plurality of sub-pixels (e.g., each pixel may include a red sub-pixel, a green sub-pixel, and a blue sub-pixel). Each frame of video is displayed (e.g., displayed briefly) as an image on the display panel. In some embodiments, the display 140 may include any device with an integrated display, such as a television, a monitor, a cellular phone, a tablet computer, a wearable device, augmented reality (AR) headset, or a virtual reality (VR) headset. In some embodiments, the transmitter 120 may include any device with an integrated display, such as a television, a monitor, a cellular phone, a tablet computer, a wearable device, augmented reality (AR) headset, or a virtual reality (VR) headset.

For example, full high definition video (or 1080p video or FullHD) includes 1920×1080 pixels. Each pixel may correspond to 24 bits of data and video data may be displayed at 60 frames per second. Thus, uncompressed full high definition video (FullHD) may correspond to a data rate of 1920*1080*24*60=3 Gbps (giga bits per second). This may be about 50 Mb of data per frame period (e.g., per one $60^{th}$ of a second or per 16.7 ms).

The wireless transmitter 120 may receive video, one frame at a time, from the video source. For example, the wireless transmitter 120 may have a double-buffer interface in memory shared with the video source, in which one buffer is a "write buffer" that the video source writes to while the wireless transmitter 120 reads video data from the other buffer, referred to as a "read buffer". Once a frame has been sent, the read and write buffer pointers may be interchanged, and for the following frame, the video source writes to the region of memory (now the write buffer) that was, during the previous frame, the read buffer, and the wireless transmitter 120 reads from the region of memory (now the read buffer) that was, during the previous frame, the write buffer. The wireless transmitter 120 may include one or more additional buffers in which it may store the most recent frame received (or the "current frame") and one or more previous frames.

The wireless transmitter 120 may receive the frames of video from the video source at a constant rate that may be referred to as the "frame rate". For example, the frame rate may be 60 frames per second (or, equivalently, 60 Hz). Accordingly, the wireless transmitter 120 may have a certain time interval, referred to herein as the "frame transmission interval", for each frame, within which to transmit data corresponding to the frame. The lengths of all of the frame transmission intervals may be substantially the same, being equal to, for example, the reciprocal of the frame rate, or $\frac{1}{60}^{th}$ of a second (approximately 17 ms) in the case of a 60 Hz frame rate.

Depending on conditions that may vary with time (e.g., the distance between the wireless transmitter 120 and the wireless receiver 130), the channel capacity of the wireless channel, or "wireless downlink channel", over which the wireless transmitter 120 may send data to the wireless receiver 130, may or may not be sufficient to transmit all of the video data in a frame (e.g., about 50 Mb for FullHD) within the frame transmission interval for the frame. Moreover, it may not be feasible to postpone sending of some of the frame data, because for an acceptable viewer experience, the image on the image displayed on the display panel may be updated at a uniform rate, and with limited latency. Accordingly, when the downlink channel capacity is insufficient to transmit one frame's worth of video data in each frame transmission interval, some of the data may be "dropped", or not transmitted.

If the data for each frame are sent in raster order, e.g., one row of pixels at a time, beginning with the top row of the display, then the dropped data may, in each frame, correspond to some number of rows at the bottom of the frame. This may result in the display not receiving, during a prolonged period of time, any new data for these rows at the bottom of the frame and, accordingly, being unable to update the portion of the image displayed there. The result may be a displayed image in which the lower part is static or "frozen", or not displayed at all (e.g., replaced with a black region). In either case, the viewer's viewing experience may be significantly compromised.

In operation, the wireless receiver 130 may monitor the quality of the wireless link downlink channel, as quantified, e.g., by a signal to noise ratio (SNR) measurement or by a received signal strength indication (RSSI) measurement. The wireless receiver 130 may then send, to the wireless transmitter 120, a recommendation for a modulation and coding scheme (MCS) index which may correspond, e.g., in the Institute of Electrical and Electronics Engineers (IEEE) 802.11ad standard, to a combination of modulation and coding techniques. For example, MCS index 10 may correspond to pi/2-16-QAM modulation with a coding rate (i.e., a forward error correction (FEC) coding rate) of 1/2, resulting in a physical layer bit rate (i.e., a net bit rate-net of FEC overhead) of 3080 Mb/s, and MCS index 9 may correspond to pi/2-QPSK modulation with a coding rate of 13/16, resulting in a physical layer bit rate of 2502 Mb/s. The wireless receiver's recommendation may be made in part to achieve a useful compromise between a high bit error rate (which may result if a high MCS index is employed) and a low data rate (which may result if a low MCS index is employed).

In another embodiment, the wireless transmitter 120 and wireless receiver 130 may operate in a time division duplexing (TDD) mode, in which case the wireless transmitter 120 may directly measure the signal to noise ratio of the uplink channel (the channel over which the wireless receiver 130 may send data to the wireless transmitter 120), and select an MCS index based on this signal to noise ratio, assuming that the uplink and downlink signal to noise ratio are the same, or at least similar. In either case, the wireless transmitter 120 may select an MCS index (based either on the uplink signal to noise ratio or on a recommendation received from the wireless receiver 130, and notify the wireless receiver 130, in advance of making a change in the modulation and coding scheme, when the change will take place and what the new MCS index will be.

Figure 2:
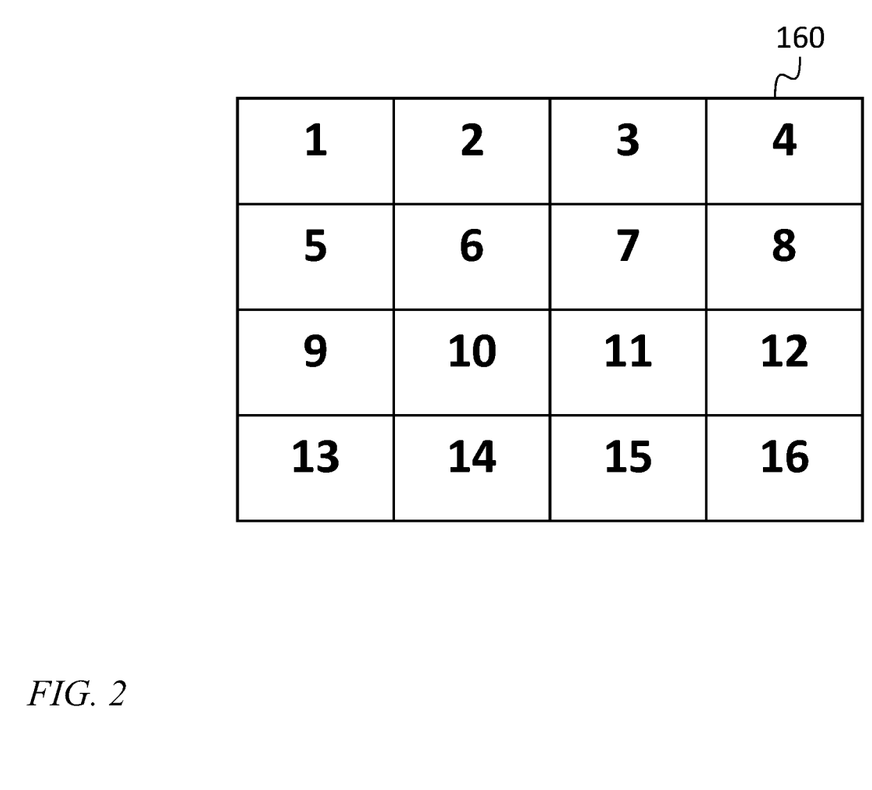
FIG. 2 is an illustration of a display panel divided into regions, according to an embodiment of the present invention.

In one embodiment, referring to FIG. 2, the display panel may be divided into N regions (e.g., 16 regions, as illustrated) numbered 1 to N (i.e., each region having a "region number" between 1 and N). These regions may be transmitted, beginning with a region of most importance (RoMI), for example in cyclic order (i.e., with each region transmitted, except region 1, having a region number that is one greater than the previously transmitted region, and with the region transmitted immediately after region N, if any, being region 1). The wireless transmitter 120 may read one region at a time (i.e., read the video data corresponding to one region at a time) from a frame buffer storing the current frame (e.g., the read buffer), encode the region using a suitable codec, and transmit the region to the wireless receiver 130, which may decode the regions (with a corresponding codec), one at a time, as they are received.

In one embodiment, the number of regions, N, can be fixed and/or predetermined based on some criteria including the frame size. In another embodiment, the number of regions, N, or equivalently the region size can be selected dynamically based on some criteria including the frame size, channel quality, and the difference between two consecutive frames. As an example, if the location of a mouse pointer is moving on consecutive frames, the number of regions can be small (in that case only one region could be different between two frames); while if two frames are different in more regions of a frame, the number of regions can be much larger (the region size is decreased).

In one embodiment, the order of transmitting regions can be cyclic order, e.g., regions are transmitted one by one after each other in increasing or decreasing order. In another embodiment, all the regions can be ordered based on the RoMI criteria, e.g. by equation in FIG. 3, and the regions can be transmitted in the order of the RoMI criteria. A mechanism may be defined for the wireless receiver 130 to know the order. In one embodiment, the order is pre-determined (based on different profiles). In another embodiment, there is an algorithm that calculates the order in both the wireless transmitter 120 and the wireless receiver 130. In another embodiment, the order of transmission may also be sent to the wireless receiver 130. There may be a control channel specifically for sending such extra information in addition to data; or the order of transmission may be sent multiplexed with data; or order of transmission may be sent first in a packet separate from the data packets; or the order of transmission may be sent as part of the header information (the header at the transport layer, the application layer, or the physical layer).

A person skilled in the art will understand that for the cases that the two consecutive frames only differ in one or two regions the use of cyclic order may be more suitable. In the cases that consecutive frames differ in more regions it may be beneficial to use an arbitrary order and convey the order number to the wireless receiver 130.

When the downlink channel capacity is adequate to send all of the data in each frame, then the region of most importance may be selected by comparing the current frame to the previous frame, calculating the amount of change within each region, and selecting the region in which the change, between the previous frame and the current frame, was greatest.

Figure 3:
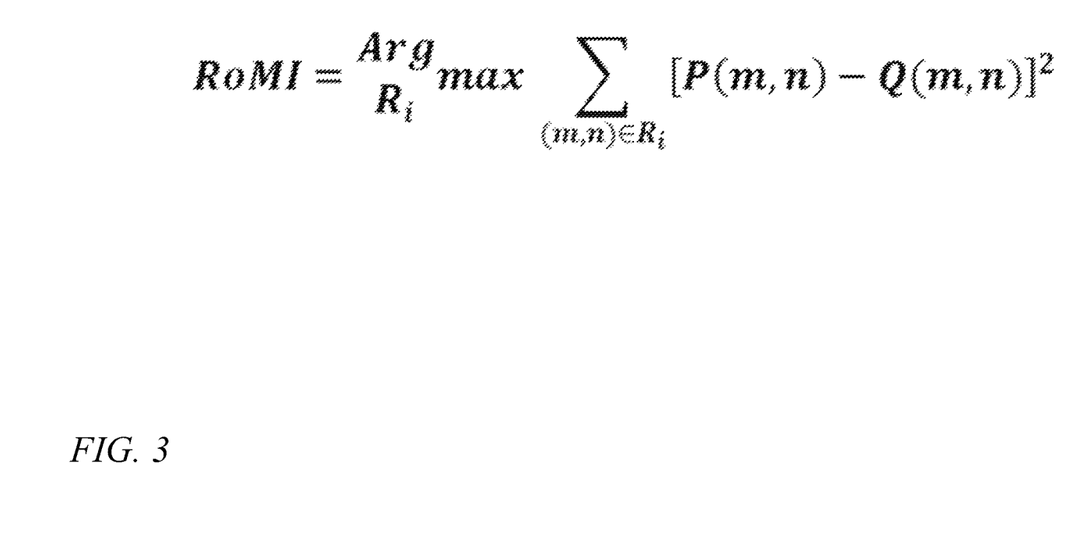
FIG. 3 is an equation for identifying a region of most importance, according to an embodiment of the present invention.

This may be calculated, for example, according to the equation of FIG. 3, where (m,n) are pixel row and column coordinates, P(m,n) represents a triplet of red, green, and blue (RGB) values for the pixel at coordinates (m,n) in the current frame and Q(m,n) represents a triplet of red, green, and blue (RGB) values for the pixel at coordinates (m,n) in the previous frame. The difference P(m,n)−Q(m,n) thus results in a triplet of differences; the quantity $[P(m,n)-Q(m,n)]^2$ denotes the sum of the squares of the three differences in this triplet of differences (this "inner" summation is not explicitly shown). These sums of squares are then summed, in an outer sum over all of the pixels in the $i^{th}$ region (i.e., the region with region number i), and the region number for which this sum is greatest is selected as the region of most importance. The sum of the equation in FIG. 3 may equivalently be represented, for any region with region number i, as a sum over all of the sub-pixels in the region, i.e., the sum, over every sub-pixel, of the square of the difference between (i) the value of the sub-pixel in the current frame and (ii) the value of the sub-pixel in the previous frame. In another embodiment, the transmitter may receive instructions from the video source regarding which region is the region of most importance. For example, a user may provide an indication of which region is the region of most importance. In a computer with a mouse, the operating system may determine the location of the mouse pointer and send to the wireless transmitter 120, via the video source, an instruction that the region in which the mouse pointer is found is the region of most importance.

Once the region of most importance has been identified, the transmission of video data for the current frame may proceed, one region at a time, beginning with the region of most importance and proceeding thereafter by region number, in cyclic order. As used herein, a second region, of a set of N numbered regions, follows a first region by region number "in cyclic order" if either (i) the second region has a region number that is one greater than the region number of the first region, or (ii) the second region has region number 1 and the first region has region number N. This method of sending the frame data beginning with a region that may differ from frame to frame may be referred to as a shift starting pixel (SSP) algorithm.

In case the order of transmissions for regions is not sent to the wireless receiver 130 (for example, if they are sent in cyclic order), the wireless transmitter 120 may inform the wireless receiver 130 at the beginning of each frame which region is being sent first. In one embodiment this is done by stamping the region number of the region being sent first in the header at the transport layer, the application layer, or the physical layer. In another embodiment, it is done by sending the region number of the region being sent first in a packet separate from the data packets. In another embodiment, there is a control channel specifically for sending such extra information in addition to data; or the region being sent first is sent multiplexed with data packets.

Figure 4:
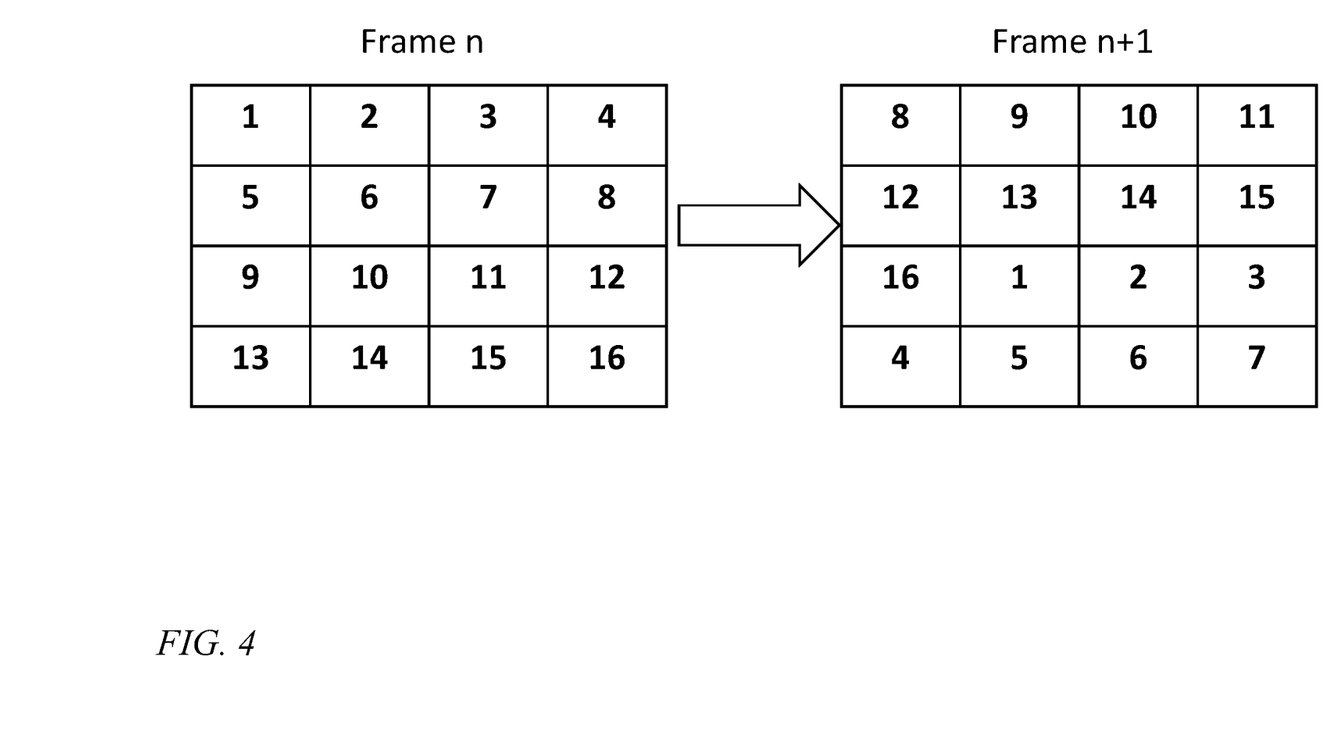
FIG. 4 is schematic diagram showing transmission order for regions in two successive frames, according to an embodiment of the present invention.

An example of the shift starting pixel algorithm is shown in FIG. 4. In a previous frame ("Frame n"), the regions are sent in order beginning with region 1. In the current frame ("Frame n+1"), it is determined, e.g., according to the equation in FIG. 3, that region 8 is the region of most importance, and accordingly, the wireless transmitter 120 transmits the frame data one region at a time, beginning with the region of most importance (region 8) and continuing by region number in cyclic order, i.e., subsequently sending regions 9-16 in order, followed by regions 1-7.

Figure 5:
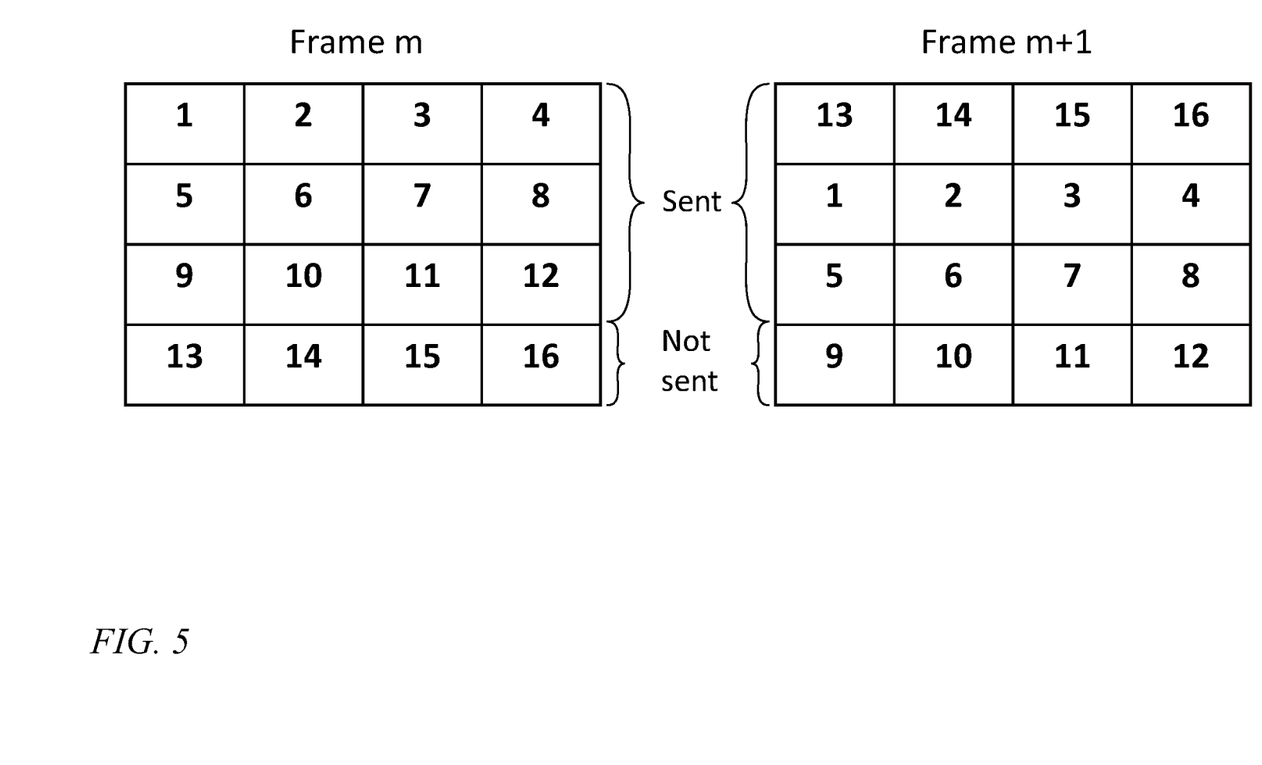
FIG. 5 is schematic diagram showing transmission order for regions in two successive frames, according to an embodiment of the present invention.

When the signal to noise ratio of the downlink changes (e.g., decreases), this may result in a switch to a different modulation and coding scheme; which in turn may cause the net downlink data rate to change (e.g., decrease). If the new data rate is lower than that corresponding to one frame's worth of data for each frame period, then, as mentioned above, in any given frame transmission interval, when the downlink channel capacity is not adequate to send all of the data in each frame, some of the data received from the video source may not be sent. In such a case, the video data may also be sent one region at a time, beginning with the region of most importance and proceeding thereafter by region number, in cyclic order. The region of most importance may however, instead of being selected according to the equation of FIG. 3, be selected to be the first region (i.e., first by region number, in cyclic order) of the regions not sent during the previous frame. For example, referring to FIG. 5, if N=16, and if the downlink channel capacity is sufficient only to send 12 regions in each frame transmission interval, then in the previous frame ("Frame m"), if the first region sent was region 1, regions 13-16 may have been dropped. In this case the region of most importance for the current frame ("Frame m+1") may be region 13 (the first region by region number, in cyclic order that was not sent in Frame m). Accordingly, in the current frame, the wireless transmitter 120 may send region 13 first, followed by the remaining regions, to the extent the downlink channel capacity will allow it, by region number in cyclic order. In particular, it may send, after region 13, regions 14-16, followed by regions 1-12, to the extent the downlink channel capacity will allow it. If it continues to be the case that the downlink channel capacity is sufficient only to send 12 regions in each frame transmission interval, then in the current frame the limited downlink channel capacity may have the result that only regions 13-16, and 1-8 are sent, as illustrated in FIG. 5.

Although in this embodiment a fraction of the video data is dropped with each frame when the downlink channel capacity is not adequate to send all of the data in each frame, the use of the SSP algorithm mitigates the effect on the viewer's viewing experience. For example, if the SSP algorithm were not used, it might be the case that regions 13-16 would be dropped repeatedly, during an extended period of time. The example of FIG. 5 shows that when the SSP algorithm is used, it may be the case instead that each region is dropped occasionally, e.g., in one of every four frames. In this manner, when the channel capacity is insufficient to update the entire display for each frame, the set of regions not being updated is different for each frame. As a result, in the situation of FIG. 5 for example, each region is updated three times out of every four frames, resulting in normal updating of the video data most of the time in each of the sixteen regions. When the downlink channel capacity is sufficient to transmit at least half of the regions, it may always be the case that if (i) in the previous frame, the regions that are sent are a first subset of the set of regions, and the regions that are dropped (not sent) are a second subset of the set of regions (the first and second subsets being disjoint, and together including all of the regions), and if (ii) in the current frame, the regions that are sent are a third subset of the set of regions, and the regions that are dropped (not sent) are a fourth subset of the set of regions (the third and fourth subsets being disjoint, and together including all of the regions), then the second subset is a subset of the third subset (i.e., every region not sent in the previous frame is sent in the current frame) and the fourth subset is a subset of the first subset (i.e., every region not sent in the current frame was sent in the previous frame). Accordingly, in this situation, there is no region that is dropped in two consecutive frames.

The wireless receiver 130 may further mitigate the effect of the omission of missing regions (from incompletely transmitted frames) in the current fame (Frame m+1) by supplementing the received regions with data from the previous frame (Frame m) for the remaining regions. For example, in the situation of FIG. 5, when the partial transmission of the current frame (Frame m+1) is received (regions 9-12 are missing), the wireless receiver 130 may supplement the received regions (13-16 and 1-8) with the video data received for regions 9-12 during the partial transmission of the previous frame (Frame m). In particular, the data received for regions 9-12 during the partial transmission of the previous frame may be redisplayed during the current frame. This approach may result in only a modest effect on the viewing experience, especially if the content of these regions is not changing rapidly.

In some embodiments, as mentioned above, the regions in each frame are ranked in order of importance and transmitted in order of decreasing importance (i.e., beginning with the region of most importance). In this ranking, the regions (if any) that were not sent during the previous frame may be given the highest rankings, and the regions that were sent during the previous frame may be ranked in decreasing order according to the respective value each has for the outer sum of the equation of FIG. 3. If the user has provided an indication of which region is the region of most importance, then this region may be inserted in the ranking, e.g., at the top of the ranking, or immediately after the images that were not sent during the previous frame.

Figure 6:
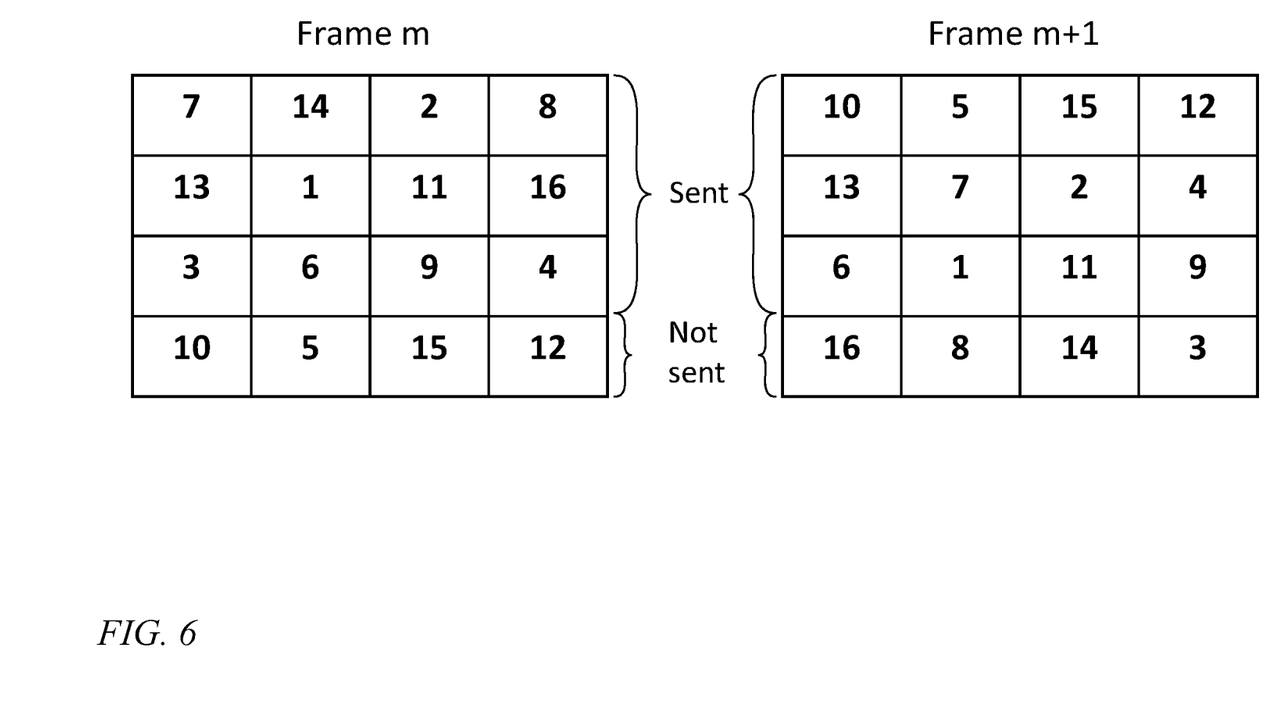
FIG. 6 is schematic diagram showing transmission order for regions in two successive frames, according to an embodiment of the present invention.

FIG. 6 shows the transmission order that may result, in this embodiment, for two consecutive frames. For the first of the two frames, all of the regions except regions 10, 5, 15, and 12 (the four least important regions of the frame) are transmitted, beginning, for example, with region 7 (the most important region of the frame). Regions 10, 5, 15, and 12 are not transmitted during the first of the two frames; accordingly, they are the most important four regions in the second of the two frames, and are transmitted first. The remaining regions are then transmitted in order of decreasing importance, except for regions 16, 8, 14, and 3, which, for the second of the two frames, are not transmitted.

Figure 7:
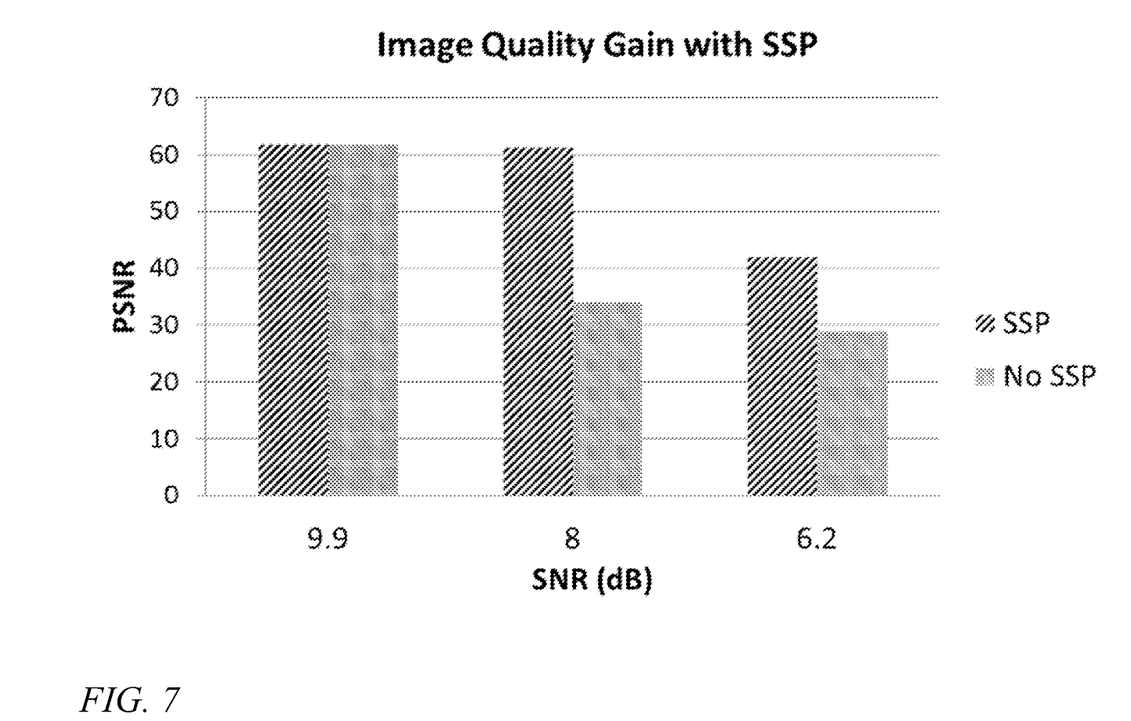
FIG. 7 is a graph of peak signal to noise ratio as a function of signal to noise ratio, according to an embodiment of the present invention.

FIG. 7 shows a graph of peak signal to noise ratio as a function of signal to noise ratio, both for a system using a shift starting pixel algorithm and a hypothetical system not using a shift starting pixel algorithm. FIG. 7 illustrates, for example, an extent to which the shift starting pixel algorithm is able to mitigate the effects of degrading signal to noise ratio.

In light of the foregoing, in some embodiments a system and method for transmitting video may be used for the transmission of video data over a wireless link having variable or limited channel capacity. Each frame of video is divided into a number of regions that are transmitted in order beginning with a region of most importance. The region of most importance may be different from one frame to the next. When the video is transmitted over a channel with limited channel capacity, so that some frames are not transmitted completely, the region of most importance in a current frame may be selected to be the first region (i.e., first in time order) not transmitted in the previous frame.

In one embodiment, the wireless transmitter may be integrated into a phone, computer, television, monitor, VR headset, augmented reality (AR) headset, or other wearable device such as a smart watch. Similarly, the receiver may be located in phone, computer, television, monitor, VR headset, augmented reality (AR) headset, or other wearable device such as a smart watch. In some embodiments, a device may include both a transmitter and receiver and be configured to be both a transmitter and receiver.

In one embodiment, the system may be configured to switch between multiple devices. For example, the transmitter may be located in a computer and a first receiver is located in a VR headset and a second receiver is located in a monitor or television. The system may switch from transmitting a video to the first receiver to transmitting the video to the second receiver according to an input (e.g. a user selection). The system may also be configured to transmit the video to multiple devices at the same time. Similarly, in another embodiment, the system may include a chain of devices transmitting and receiving. For example, a first transmitter may be located in a first device, a first receiver and a second transmitter may be located in a second device, and a second receiver may be located in a third device. The video may then be transmitted from the first device to the second device and from the second device to the third device. In one embodiment, an intermediary device may also add content to a device further down the chain. For example, a wearable device including a transmitter may send a video to a receiver located within an augmented reality headset. The augmented reality headset may include a camera that records the wearer's field-of-view. The augmented reality headset also includes a transmitter and transmits a combined video that includes the video recorded by the headset combined an overlay of the video transmitted by the wearable device.

A display device and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the display device may be formed on one integrated circuit (IC) chip or on separate IC chips. Further, the various components of the display device may be implemented on a flexible printed circuit film, a tape carrier package (TCP), a printed circuit board (PCB), or formed on a same substrate as the display device. Further, the various components of the display device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for sending video data over a wireless channel have been specifically described and illustrated herein, many modifications and variations will be apparent to those skilled in the art. Accordingly, it is to be understood that a system and method for sending video data over a wireless channel constructed according to principles of this invention may be embodied other than as specifically described herein. The invention is also defined in the following claims, and equivalents thereof.

What is claimed is:

1. A method for transmitting video for a display panel comprising N regions, numbered 1 through N, wherein N is a positive integer, the method comprising:
   identifying, for a first frame of video, a first region of most importance, from among the N regions;
   transmitting data from the first frame of video, one region at a time, beginning with the first region of most importance, until a first frame transmission interval corresponding to the first frame of video has elapsed;
   identifying, for a second frame of video, a second region of most importance, from among the N regions, the second region of most importance being different from the first region of most importance, wherein the identifying of the second region of most importance comprises:
   identifying a region from among the N regions for which a measure of a difference between data for the first frame and data for the second frame is greatest, when during the first frame transmission interval all N regions were transmitted; and
   selecting the region having a next region number following, in cyclic order, a region number of a last region transmitted during the first frame transmission interval, when during the first frame transmission interval not all N regions were transmitted; and
   transmitting data from the second frame of video, one region at a time, beginning with the second region of most importance, until a second frame transmission interval corresponding to the second frame of video has elapsed.

2. The method of claim 1, wherein the identifying of the second region of most importance comprises identifying a region from among the N regions for which a measure of the difference between data for the first frame and data for the second frame is greatest, when during the first frame transmission interval all N regions were transmitted.

3. The method of claim 2, wherein the first frame of video comprises sub-pixel data, the second frame of video comprises sub-pixel data, and the measure of the difference is a sum, over the sub-pixel data in the region, of:
a square of:
the difference between:
a value of the sub-pixel data of the first frame of video, and
a value of the sub-pixel data of the second frame of video.

4. The method of claim 1, wherein the identifying of the second region of most importance comprises receiving from a user an indication of which region is the region of most importance.

5. The method of claim 1, wherein:
the transmitting of data from the first frame of video further comprises transmitting an identifier for the first region of most importance.

6. The method of claim 1, wherein:
the transmitting of data from the first frame of video, one region at a time, comprises encoding the data from the first frame of video, one region at a time; and
the transmitting of data from the second frame of video, one region at a time, comprises encoding the data from the second frame of video, one region at a time.

7. The method of claim 6, further comprising:
receiving data from the first frame of video, one region at a time;
decoding the data from the first frame of video, one region at a time;
receiving data from the second frame of video, one region at a time; and
decoding the data from the second frame of video, one region at a time.

8. The method of claim 7, further comprising:
supplementing the decoded data from the second frame of video with corresponding data from the first frame of video, when during the second frame transmission interval not all N regions were transmitted.

9. The method of claim 1, wherein the transmitting of data from the first frame of video, one region at a time, beginning with the first region of most importance, comprises transmitting data by region number in cyclic order.

10. The method of claim 1, wherein the transmitting of data from the first frame of video, one region at a time, beginning with the first region of most importance, comprises transmitting data by region number in order of decreasing importance.

11. A transmitter for transmitting video for a display panel comprising N regions, numbered 1 through N, wherein N is a positive integer, the transmitter being configured to:
identify, for a first frame of video, a first region of most importance, from among the N regions;
transmit data from the first frame of video, one region at a time, beginning with the first region of most importance, by region number in cyclic order, until a first frame transmission interval corresponding to the first frame of video has elapsed;
identify, for a second frame of video, a second region of most importance, from among the N regions, the second region of most importance being different from the first region of most importance wherein the identifying of the second region of most importance comprises:
identifying a region from among the N regions for which a measure of a difference between data for the first frame and data for the second frame is greatest, when during the first frame transmission interval all N regions were transmitted, and
selecting the region having a next region number following, in cyclic order, a region number of a last region transmitted during the first frame transmission interval, when during the first frame transmission interval not all N regions were transmitted; and
transmit data from the second frame of video, one region at a time, beginning with the second region of most importance, by region number in cyclic order, until a second frame transmission interval corresponding to the second frame of video has elapsed.

12. The transmitter of claim 11, wherein the first frame of video comprises sub-pixel data, the second frame of video comprises sub-pixel data, and the measure of the difference is a sum, over the sub-pixel data in the region, of:
a square of:
the difference between:
a value of the sub-pixel data of the first frame of video, and
a value of the sub-pixel data of the second frame of video.

13. The transmitter of claim 11, wherein the identifying of the second region of most importance comprises receiving from a user an indication of which region is the region of most importance.

14. The transmitter of claim 11, wherein:
the transmitting of data from the first frame of video further comprises transmitting an identifier for the first region of most importance.

15. A method for transmitting video over a wireless link, the method comprising:
storing a first frame of video data in a buffer;
dividing the first frame into N regions, N being a positive integer;
identifying, for the first frame of video data, a first region of most importance, from among the N regions;
sending, over the wireless link, beginning with the first region of most importance, by region number in cyclic order, until a first frame transmission interval corresponding to the first frame of video has elapsed;
storing a second frame of video data in a buffer; dividing the second frame into the N regions;
identifying, for the second frame of video data, a second region of most importance, from among the N regions, the second region of most importance being different from the first region of most importance wherein the identifying of the second region of most importance comprises:
identifying a region from among the N regions for which a measure of a difference between data for the first frame and data for the second frame is greatest, when during the first frame transmission interval all N regions were transmitted, and
selecting the region having the next region number following, in cyclic order, a region number of a last region transmitted during the first frame transmission interval, when during the first frame transmission interval not all N regions were transmitted; and
sending, over the wireless link, video data from second frame of video, one region at a time, beginning with the second region of most importance, by region number in cyclic order, until a second frame transmission interval corresponding to the second frame of video has elapsed.

16. The method of claim 15, wherein the regions in the fourth subset are in the first subset.

17. The method of claim 15 further comprising:
- before the sending of the video data from a first subset of the N regions, encoding the video data from the first subset one region at a time; and
- before the sending of the video data from a third subset of the N regions, encoding the video data from the third subset one region at a time.

18. The method of claim 15 further comprising:
- receiving the video data from a first subset of the N regions;
- displaying a first image including the video data from a first subset of the N regions;
- receiving the video data from a third subset of the N regions; and
- displaying a second image including:
  - the video data from a third subset of the N regions; and
  - video data from regions, of the first subset of the N regions, corresponding to the fourth subset of the N regions.

\* \* \* \* \*